(12) United States Patent
Zhang et al.

(10) Patent No.: US 11,002,859 B1
(45) Date of Patent: May 11, 2021

(54) INTELLIGENT VEHICLE POSITIONING METHOD BASED ON FEATURE POINT CALIBRATION

(71) Applicant: Tsinghua University, Beijing (CN)

(72) Inventors: Xinyu Zhang, Beijing (CN); Jun Li, Beijing (CN); Shichun Guo, Beijing (CN); Huaping Liu, Beijing (CN); Mo Zhou, Beijing (CN); Wenju Gao, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/089,742

(22) Filed: Nov. 5, 2020

(30) Foreign Application Priority Data

Feb. 27, 2020 (CN) .......................... 202010124025.8

(51) Int. Cl.
| | | |
|---|---|---|
| *G01S 17/00* | (2020.01) | |
| *G01S 13/00* | (2006.01) | |
| *G05D 1/02* | (2020.01) | |
| *H01Q 1/00* | (2006.01) | |
| *G01S 19/00* | (2010.01) | |

(Continued)

(52) U.S. Cl.
CPC .......... *G01S 19/393* (2019.08); *G01S 19/243* (2013.01); *G01S 19/48* (2013.01); *G06K 9/00791* (2013.01); *G06K 9/6232* (2013.01); *B60W 60/001* (2020.02); *B60W 2420/52* (2013.01)

(58) Field of Classification Search
None
See application file for complete search history.

(56) References Cited

U.S. PATENT DOCUMENTS

| 10,565,457 B2 * | 2/2020 | Luo ................. G06K 9/00791 |
|---|---|---|
| 10,599,150 B2 * | 3/2020 | Graham ............... G05D 1/021 |

(Continued)

FOREIGN PATENT DOCUMENTS

| CN | 1948910 A | 4/2007 |
|---|---|---|
| CN | 103517361 A | 1/2014 |

(Continued)

OTHER PUBLICATIONS

Jianhui Zhao et al., Automatic Driving Control Based on Time Delay Dynamic Predictions, J Tsinghua Univ (Sci & Technol), 2018, pp. 432-437, vol. 58 No. 4.

*Primary Examiner* — Adam D Tissot
(74) *Attorney, Agent, or Firm* — Bayramoglu Law Offices LLC

(57) ABSTRACT

An intelligent vehicle positioning method based on feature point calibration is provided. The intelligent vehicle positioning method includes: determining whether an intelligent vehicle is located in a blind area or a non-blind area; when the intelligent vehicle is located in a GNSS non-blind area, combining GNSS signals, odometer data and inertial measurement unit data, acquiring a current pose of the intelligent vehicle through a Kalman filtering, scanning a surrounding environment of the intelligent vehicle by using a laser radar, extracting corner points and arc features and performing processing to obtain the corner points and circle centers as the feature points, calculating global coordinates and weights of the feature points and storing the global coordinates and the weights of the feature points in a current feature point list.

3 Claims, 5 Drawing Sheets

(51) Int. Cl.
    *G01S 19/39*     (2010.01)
    *G01S 19/24*     (2010.01)
    *G01S 19/48*     (2010.01)
    *G06K 9/62*     (2006.01)
    *G06K 9/00*     (2006.01)
    *B60W 60/00*     (2020.01)

(56) References Cited

U.S. PATENT DOCUMENTS

| | | | |
|---|---|---|---|
| 2011/0291884 A1* | 12/2011 | Oh | G01S 19/48 342/357.31 |
| 2020/0064483 A1* | 2/2020 | Li | G01S 17/87 |
| 2020/0116502 A1* | 4/2020 | Xu | G01C 21/343 |
| 2020/0334857 A1* | 10/2020 | Garud | G06K 9/4671 |
| 2021/0048540 A1* | 2/2021 | Miller | G01S 19/48 |

FOREIGN PATENT DOCUMENTS

| | | | |
|---|---|---|---|
| CN | 103856989 | A | 6/2014 |
| CN | 105137468 | A | 12/2015 |
| CN | 105824039 | A | 8/2016 |
| CN | 106352867 | A | 1/2017 |
| CN | 109099923 | A | 12/2018 |
| CN | 109708632 | A | 5/2019 |
| CN | 109807911 | A | 5/2019 |
| CN | 110388924 | A | 10/2019 |
| CN | 110411462 | A | 11/2019 |
| EP | 0679903 | A2 | 11/1995 |
| EP | 2133662 | A2 | 12/2009 |

* cited by examiner

INTELLIGENT VEHICLE POSITIONING METHOD BASED ON FEATURE POINT CALIBRATION

CROSS REFERENCE TO THE RELATED APPLICATIONS

This application is based upon and claims priority to Chinese Patent Application No. 202010124025.8, filed on Feb. 27, 2020, the entire contents of which are incorporated herein by reference.

TECHNICAL FIELD

The present invention relates to the field of intelligent vehicle positioning methods, in particular to an intelligent vehicle positioning method based on feature point calibration.

BACKGROUND

The research on positioning of intelligent vehicles is a hot and difficult topic in autonomous driving. In the current research on positioning methods, due to insufficient accuracy of GNSS signals, the GNSS is often used in combination with other sensors such as an odometer and an IMU for fusion positioning to achieve a better positioning effect. However, when the intelligent vehicle enters an environment of a tunnel or a tree-lined road with lush branches and leaves, the GNSS signal quality is too poor to provide effective positioning information. Only relying on the odometer and IMU for positioning causes accumulated errors and drifts, so that the positioning accuracy requirement is difficult to ensure.

SUMMARY

An objective of the present invention is overcoming the above-mentioned technical drawbacks, and providing an intelligent vehicle positioning method based on feature point calibration, in which when the GNSS signal quality is good, a GNSS is used in combination with an odometer and an IMU to obtain a current locating position by Kalman filtering, and at the same time, a laser radar is used to observe a surrounding corner point, arc and other features and perform recording and calibration, and after data is stable, the data is converted to a global coordinate system for storage; and when the GNSS signal quality is worse, the intelligent vehicle uses the laser radar to observe the previously calibrated points, and evaluates and corrects odometer and IMU reckoned information by a particle filtering process, so that a relatively accurate positioning effect can still be maintained for a long period of time even if there is no GNSS signal, thus ensuring safe traveling and real-time state monitoring of the intelligent vehicle. This method can solve the problem of an unstable positioning effect when the intelligent vehicle enters an GNSS blind area such as a tunnel, an urban road with densely distributed buildings, or a tree-lined road.

To achieve the above objective, the present invention proposes an intelligent vehicle positioning method based on feature point calibration, the method including:

determining GNSS signal quality according to the number of locked-on GNSS satellites, and thereby determining whether an intelligent vehicle is in a blind area or a non-blind area;

when the intelligent vehicle is located in a GNSS non-blind area, combining GNSS signals, odometer data and inertial measurement unit data, acquiring a current pose of the intelligent vehicle through Kalman filtering, at the same time scanning a surrounding environment of the intelligent vehicle by using a laser radar, extracting corner points and arc features and performing processing to obtain corner points and circle centers as feature points, calculating global coordinates and weights of the feature points and storing the same in a current feature point list;

adding the feature points in the current feature point list into an existing feature point list, and adding feature points meeting conditions in the existing feature point list into a trusted list; and when the intelligent vehicle is located in a GNSS blind area, acquiring feature points of a surrounding trusted list as an observed quantity by using a laser radar, fusing odometer data and inertial measurement unit data, and acquiring a current pose of the intelligent vehicle by a particle filtering method, thereby achieving positioning seamless switching of the intelligent vehicle entering the blind area from the non-blind area.

As an improvement of the above-mentioned method, when the intelligent vehicle is in a GNSS non-blind area, combining GNSS signals, odometer data and inertial measurement unit data, acquiring a current pose of the intelligent vehicle through Kalman filtering specifically includes:

step 1-1) calculating displacement and heading angle changes of the intelligent vehicle by photoelectric encoders on a left rear wheel and a right rear wheel of the intelligent vehicle, a specific process of which is as follows:

calculating position increments $\Delta d_L$ and $\Delta d_R$ of the left rear wheel and the right rear wheel in unit sampling time T:

$$\Delta d_L = \frac{\Delta N_L * \pi * D}{P * T_S * m}$$

$$\Delta d_R = \frac{\Delta N_R * \pi * D}{P * T_S * m}$$

where $\Delta N_L$ and $\Delta N_R$ are respectively pulse increments in the sampling time of the left rear wheel and the right rear wheel, D is an equivalent diameter of the wheel, P is a total number of gratings of an optical code disc, and m is a deceleration rate of the encoder;

calculating a displacement change $\Delta D_k$ and a heading angle change $\Delta\theta_k^{WO}$ of the intelligent vehicle from a moment $t_{k-1}$ to a moment $t_k$:

$$\Delta D_k = \frac{\Delta d_R + \Delta d_L}{2},$$

$$\Delta\theta_k^{WO} = \frac{\Delta d_R - \Delta d_L}{W}$$

where W is an axial length of the two rear wheels; and calculating a speed at the moment $t_k$:

$$V_k = \frac{\Delta D_k}{T_S}$$

step 1-2) acquiring a heading angular acceleration $\omega_k$ directly from an inertial measurement unit (IMU) at the moment $t_k$, and further integrating the angular acceleration $\omega_k$ at each moment to obtain a second heading angle change $\Delta\theta_k^{IMU}$, where the heading angle $\theta_k^{IMU}=\theta_{k-1}+\Delta\theta_k^{IMU}$;

step 1-3) performing coordinate conversion on GNSS information collected by the intelligent vehicle to obtain a position ($x_k^{GNSS}$, $y_k^{GNSS}$) a of the intelligent vehicle at the moment $t_k$.

steps 1-4) fusing the above information by a Kalman filter; defining a state of the intelligent vehicle at the moment $t_{k-1}$ as: $X_{k-1}=[x_{k-1}, y_{k-1}, V_{k-1}, \theta_{k-1}, \omega_{k-1}]^T$, motion and observation models respectively as:

$$\hat{X}_k = f(X_{k-1}) + c_k, c_k \sim N(0, Q),$$
$$\hat{z}_k = h(\hat{X}_k) + v_k, v_k \sim N(0, R)$$

and a state transition function of a movement process as:

$$f(x_{k-1}) = \begin{bmatrix} x_{k-1} + \frac{\Delta D_k}{\Delta\theta_k^{WO}}(\sin(\theta_{k-1}+\Delta\theta_k^{WO}) - \sin\theta_{k-1}) \\ y_{k-1} - \frac{\Delta D_k}{\Delta\theta_k^{WO}}(\cos(\theta_{k-1}+\Delta\theta_k^{WO}) - \cos\theta_{k-1}) \\ V_k \\ \theta_{k-1} + \Delta\theta_k^{WO} \\ \omega_k \end{bmatrix}$$

where $\hat{X}_k=[\hat{x}_k, \hat{y}_k, \hat{V}_k, \hat{\theta}_k, \hat{\omega}_k]$ is a predicted state of the intelligent vehicle at the moment $t_k$, $h(\hat{X}_k)$ is an observation model transfer function, $\hat{z}_k$ is an observed quantity with a noise added, $c_k$ is a system process noise with a covariance of Q, and $v_k$ is a sensor measurement noise with a covariance of R. acquiring the current pose of the intelligent vehicle based on the above models.

As an improvement of the above-mentioned method, a predicting and updating process of the Kalman filter is specifically:

predicting a state quantity: $\hat{X}_{(k|k-1)}=A\tilde{X}_{k-1}$ predicting an error covariance matrix: $P_{(k|k-1)}=AP_{k-1}A^T+Q$ updating an optimal estimated state quantity: $\tilde{X}_{(k)}=\hat{X}_{(k|k-1)}+K_k[z_k-H\hat{X}_{(k|k-1)}]$ updating a Kalman gain:

$$K_k = \frac{P_{(k|k-1)}H^T}{[HP_{(k|k-1)}H^T + R]}$$

updating the error covariance matrix: $P_k=[I-K_k H]P_{(k|k-1)}$ where $\hat{X}_{(k|k-1)}$ is a predicted pose state quantity at the moment $t_k$, A is a state transition matrix, $\tilde{X}_{k-1}$ is an optimal pose state quantity at the moment $t_{k-1}$, $P_{k-1}$ is an updated error covariance matrix at the moment $t_{k-1}$, $K_k$ is a Kalman gain at the moment $t_k$, H is a measurement matrix, and an observed quantity is $z_k=[x_k^{GNSS}, y_k^{GNSS}, V_k, \theta_k^{IMU}, \omega_k]$; and $\tilde{X}_k$ is an optimal pose state quantity at the moment $t_k$.

As an improvement of the above-mentioned method, scanning a surrounding environment of the intelligent vehicle by using a laser radar, extracting corner points and arc features and performing processing to obtain corner points and circle centers as feature points, calculating global coordinates and weights of the feature points and storing the same in a current feature point list specifically includes:

removing individual noise points in point cloud data acquired by the laser radar according to a pre-designed point cloud density threshold; and then segmenting a point cloud into different point cloud clusters according to a Euclidean distance threshold between each point;

extracting arc features from the point cloud clusters based on a Hough transform mechanism, and with corresponding circle centers thereof as feature points, using coordinates of the circle centers as coordinates ($x_L$, $y_L$) of the feature points in a local coordinate system of a vehicle body, and calculating weights thereof;

detecting corner points from the point cloud clusters as feature points, using coordinates of the corner points as coordinates ($x_L$, $y_L$) of the feature points in the local coordinate system of the vehicle body, and calculating weights thereof;

converting the coordinates ($x_L$, $y_L$) of the feature points in the local coordinate system of the vehicle body to coordinates ($x_G$, $y_G$) in a global coordinate system, and storing the coordinates together with the weights in the current feature point list.

As an improvement of the above-mentioned method, extracting arc features from the point cloud clusters based on a Hough transform mechanism, and with corresponding circle centers thereof as feature points, using coordinates of the circle centers as coordinates ($x_L$, $y_L$) of the feature points in a local coordinate system of a vehicle body, and calculating weights thereof specifically includes:

for a certain point cloud cluster, each point casting a vote on a certain circle parameter through Hough transform, which is expressed by a formula: $(x-a)^2+(y-b)^2=R^2$; adding constraints: a. the number of votes is greater than a threshold; and b. the diameter of a composite circle is greater than a threshold; and using a circle parameter that meets both the above two constraints as an observable arc feature;

determining center coordinates and weight according to the obtained arc feature:

defining a vote number weigh $x_1^r=1/N$, where N is the number of votes obtained for the circle feature, and an arc weight $w_2^r=\alpha/2\pi$, where $\alpha$ is a central angle corresponding to an arc formed by scanning points and is expressed by a formula $\alpha=\arcsin(L/2R)$, and L is a chord length obtained by connecting two ends of the arc, and if a distance from a point in the arc to the chord is greater than R, the corresponding central angle is greater than $\pi$, and in this case $\alpha=2\pi-\arcsin(L/2R)$;

using a circle center corresponding to the arc as a feature point with coordinates ($x_L$, $y_L$) in the local coordinate system of the vehicle body, and the weight is $w_1^r \times w_2^r$.

As an improvement of the above-mentioned method, detecting corner points from the point cloud clusters as feature points, using coordinates of the corner points as coordinates ($x_L$, $y_L$) of the feature points in the local coordinate system of the vehicle body, and calculating weights thereof specifically includes:

detecting breakpoints in each point cloud cluster: if a distance between one point and the next point is greater than a breakpoint detection threshold, then considering the two points as breakpoints; further segmenting the point cloud cluster by the breakpoints;

connecting a starting point and an end point of a segment of point cloud cluster Si to obtain a straight line l, calculating a distance from each point in the point cloud cluster to the straight line l, and finding a point $K_p$ with the largest distance, and if the distance $d_p$ from the point to the straight line l is greater than a set threshold $d_{max}$, considering the point as a corner point, and segmenting the point cloud cluster $S_i$ into two sub-point cloud clusters using the point as a dividing point, and then executing the above-mentioned corner point determination process on the two segmented point cloud clusters respectively, until corner points in all point cloud clusters are found; at the same time, adding two constraints: a. distances from the corner point to end points of straight lines on both sides are greater than a certain threshold; and b. the numbers of scanning points of the straight lines on both sides are greater than a set value; and removing corner points that do not meet the above two constraints;

fitting the sub-point cloud clusters on both sides of the obtained corner point into two straight lines $l_1$ and $l_2$ by using a least square method, wherein a fitting process of any one of the straight lines is as follows:

designing a cost function:

$$J(\alpha, \rho) = \min \sum_{s=1}^{S} (\rho - a_s \cos\alpha - b_s \sin\alpha)$$

where $\rho$ is a vertical distance from an origin of the local coordinate system of the vehicle body to the straight line, $\alpha$ is an included angle between an x axis and a normal of the straight line, and $(a_s, b_s)$ is coordinates of the sth laser radar scanning point in the local coordinate system of the vehicle body; and a parameter $\varepsilon = \text{var}(\Delta\rho_1, \Delta\rho_2, \ldots, \Delta\rho_s)$ is used to measure an error of a straight line feature parameter, where $\Delta\rho_s$ represents a vertical distance from a scanning point in the straight line to the straight line, and $1 \leq s \leq S$; and a weight of the straight line is $$\frac{1}{\varepsilon};$$

finding an intersection point of the two straight lines by using the straight line feature parameters, and using coordinates of the intersection point as coordinates $(x_L, y_L)$ of the feature point in the local coordinate system of the vehicle body;

calculating a weight $w_1^c \times w_2^c$ of the feature point, where $w_1^c, w_2^c$ are weights $l_1$ and $l_2$ of the straight line respectively.

As an improvement of the above-mentioned method, adding the feature points in the current feature point list into an existing feature point list specifically includes:

calculating a weighted average of all recorded coordinates of any column in the existing feature point list as quasi-coordinates $X_s$ of a feature point in the column:

$$X_s = \sum_{f=1}^{F} w_f Z_f$$

where a subscript f represents a recorded coordinate serial number of the feature point, $Z_f$ is recorded coordinates, and $w_f$ is a corresponding weight;

taking a feature point from the current feature point list and matching the same with the existing feature point list; if a distance between the feature point and quasi-coordinates in a column of the existing feature point list is less than a threshold, considering the matching as successful, and adding coordinate and weight information of the feature point to the column; and if the matching is unsuccessful, considering the feature point as a new feature point, creating a new column in the existing feature point list, and saving the new feature point.

As an improvement of the above-mentioned method, adding feature points meeting conditions in the existing feature point list into a trusted list specifically includes:

step 2-1) for a certain feature point in the existing feature point list, defining a total number of observations $N_A$ as a total number of scans of the surrounding environment since the laser radar scanned the certain feature point, defining an effective number of observations $N_V$ as a total number of successful matches of the certain feature, defining an effective observation rate as $N_V/N_A \times 100\%$, and if the feature point meets conditions that $N_V$ is greater than a threshold and the effective observation rate is greater than a threshold, preparing to adding the feature point to the trusted list;

defining the number of optimal estimation points $N = N_V \times \beta$, where $\beta$ in the formula is an optimal estimation rate, and re-calculating the quasi-coordinates after new recorded coordinates are added:

$$X_s = \sum_{f=1}^{F+1} w_f Z_f$$

taking the nearest N points from Xs and calculating a weighted average again to obtain modified coordinates:

$$X_F = \sum_{n=1}^{N} w_n Z_n$$

calculating a weight $w_F = 1/\varepsilon_V$, where $\varepsilon_V$ is a distribution variance of the optimal estimation point, and at the same time amplifying $\varepsilon_V$, and removing feature point coordinates outside an amplified distribution range;

if $w_F$ is greater than a threshold, adding the modified coordinates $X_F$ and weight $w_F$ of the feature point to the trusted list.

As an improvement of the above-mentioned method, when the intelligent vehicle is in a GNSS blind area, acquiring surrounding trusted feature points as an observed quantity by using a laser radar, fusing odometer data and inertial measurement unit data, and acquiring a current pose of the intelligent vehicle by a particle filtering method specifically includes:

step 3-1) using an optimal pose $\tilde{X}_0 = (x_0, y_0, \theta_0)$ at a moment before the intelligent vehicle enters the GNSS blind area as an initial distribution of a particle swarm, constructing a probability density function by $\tilde{X}_0$ and an error covariance matrix $P_0$ as a proposal distribution $\tilde{q}$, randomly selecting M initial particles, creating a Gaussian distribution for the particles around $(x_0, y_0, \theta_0)$ in the proposal distribution, $\tilde{q}$, then expressing the state of the ith particle at the moment $t_k$ as $X_k^i = [x_k^i, y_k^i, \theta_k^i]^T$, and calculating a weight thereof $w_0^i = 1/M$;

step 3-2) performing a particle prediction process:

at the moment $t_k$, using an equation of motion $X_k^i = g(X_{k-1}^i) + d_{k-1}$, $d_{k-1} \sim N(0, Q_1)$, wherein a state transition function is:

$$g(x_{k-1}^i) = \begin{bmatrix} x_{k-1}^i + \frac{\Delta D_k}{\Delta \theta_k^{WO}}(\sin(\theta_{k-1}^i + \Delta\theta_k^{WO}) - \sin\theta_{k-1}^i) \\ y_{k-1}^i - \frac{\Delta D_k}{\Delta \theta_k^{WO}}(\cos(\theta_{k-1}^i + \Delta\theta_k^{WO}) - \cos\theta_{k-1}^i) \\ \theta_{k-1}^i + \Delta\theta_k^{IMU} \end{bmatrix}$$

where $d_{k-1}$ in the formula is a system process noise of a covariance matrix $Q_1$;

step 3-3) acquiring current feature points of the surrounding environment of the intelligent vehicle as an observed quantity by using the laser radar, at the same time performing matching on feature points from the trusted list, calculating a predicted observed quantity of the matched feature points for the particles, and thereby calculating a difference between the predicted observed quantity and the observed quantity;

step 3-4) updating weights:

updating weights of the particles according to the difference between the predicted observed quantity and the observed quantity:

$$w_k^i = w_{k-1}^i \prod_{n=1}^{N} \frac{1}{2\pi\sigma_x\sigma_y} e^{-\frac{1}{2}\left(\left(\frac{\Delta x_n^i}{\sigma_x}\right)^2 + \left(\frac{\Delta y_n^i}{\sigma_y}\right)^2\right)} \cdot w_F^n$$

where N is the number of feature points matching the current surrounding environment of the intelligent vehicle from the trusted list, $\sigma_x$ and $\sigma_y$ represent measurement variances of the laser radar, and $w_F^n$ represent weights of the feature points; and $\Delta \bar{x}_n^i$ and $\Delta \bar{y}_n^i$ are errors of a predicted observed quantity and an observed quantity of the nth feature point for the ith particle, and $1 \le n \le N$, steps 3-5) normalizing weights:

$$\tilde{w}_k^i = \frac{\tilde{w}_k^i}{\sum_{i=1}^{M} w_k^i};$$

step 3-6) calculating the number of effective particles $$\tilde{N}_{\text{eff}} = \frac{1}{\sum_{i=1}^{M} \tilde{w}_k^i};$$

if $N_{\text{eff}}$ is less than a threshold, performing a resampling process, in which a low-variance resampling is used for sampling, and particles with larger weights are more likely to be retained, and normalizing all particle weights to 1/M after resampling is completed; otherwise, proceeding to step 3-7);

step 3-7) performing state estimation output:

at the moment $t_k$, calculating a state estimation value $$X_k = \sum_{i=1}^{M} \tilde{w}_k^i X_k^i,$$

thereby obtaining the current pose of the intelligent vehicle.

As an improvement of the above-mentioned method, acquiring current feature points of the surrounding environment of the intelligent vehicle as an observed quantity by using the laser radar, at the same time performing matching on feature points from the trusted list, calculating a predicted observed quantity of the matched feature points for the particles, and thereby calculating a difference between the predicted observed quantity and the observed quantity specifically includes:

based on a predicted state $X_k^i = [x_k^i, y_k^i, \theta_k^i]^T$ of the ith particle obtained after step 3-2) at the moment $t_k$, establishing a local coordinate system of the ith particle by using a predicted position $(x_k^i, y_k^i)$ of the ith particle as an origin, a forward direction of the intelligent vehicle as an X direction, a direction perpendicular to the X axis and oriented to the left of the vehicle body as a Y axis direction, and a vertically upward direction as a Z axis;

calculating x, y axial distances $\Delta x_j^i$ and $\Delta y_j^i$ of the feature points in the trusted list and the particles in the global coordinate system one by one, where the subscript represents the jth feature point, and the superscript represents the ith particle; further calculating a Euclidean distance $\Delta O_j^i = \sqrt{(\Delta x_j^i)^2 + (\Delta y_j^i)^2}$, and if the distance is less than a high-precision detection range of the laser radar, determining that the jth feature point is within the detection range, storing the feature point in a comparison list, and re-assigning a sequence number n to represent a sequence thereof, thus obtaining a total of N feature points that meet the requirement; and converting a distance in the global coordinate system corresponding to the nth feature point to a distance in the local coordinate system of the ith particle:

$$\begin{cases} \Delta x_n^{i'} = \Delta x_n^i \cos\theta_i^k + \Delta y_n^i \sin\theta_i^k \\ \Delta y_n^{i'} = -\Delta x_n^i \sin\theta_i^k + \Delta y_n^i \cos\theta_i^k \end{cases}$$

where $\Delta x_n^{i'}$ and $\Delta y_n^{i'}$ are a predicted observed quantity of the nth feature point for the ith particle;

at the current moment $t_k$, scanning the surrounding environment by the laser radar, detecting circle centers and corner points and calculating feature point coordinates $(x_q, y_q)$ in the local coordinate system of the vehicle body, and storing the same in the current feature point list, where q represents a serial number and $(x_q, y_q)$ is an observed quantity thereof, and the total number of current feature points is $q_{max}$;

calculating, one by one, differences $\Delta \bar{x}_{nq}^i$ and $\Delta \bar{y}_{nq}^i$ between the observed quantity corresponding to the feature point coordinates in the current feature point list and the predicted observed quantity of the nth calibration point for the ith particle in the comparison list;

$$\begin{cases} \Delta \bar{x}_{nq}^i = \Delta x_n^{i'} - x_q \\ \Delta \bar{y}_{nq}^i = \Delta y_n^{i'} - y_q \end{cases}$$

finally, forming simultaneous equations by a nearest neighbor method: calculating a minimum value $$\min\left(\sqrt{(\Delta \bar{x}_{nq}^i)^2 + (\Delta \bar{y}_{nq}^i)^2}, q = 1, 2 \ldots q_{max}\right)$$

of the feature point n in the comparison list, calculating a corresponding serial number $q_0$ of the minimum value, thus forming simultaneous equations of n and $q_0$, with a corresponding error $\Delta \bar{x}_{nq_0}{}^i$ and $\Delta \bar{y}_{nq_0}{}^i$, denoted by $\Delta \bar{x}_n{}^i$ and $\Delta \bar{y}_n{}^i$, traversing the comparison list and executing the process, to accomplish feature point recognition and matching.

Compared with existing intelligent vehicle positioning method, the itch present invention has the following beneficial effects:

1. In the method of the present invention, when the GNSS signal quality is good, surrounding environment features are observed and recorded in advance, with information of GNSS absolute positioning being included in coordinates of calibrated points. Upon entering a GNSS blind area, evaluation and update of a locating position of the intelligent vehicle can be started, and the intelligent vehicle does not need local mapping in advance in the blind area. The method can be widely applied in scenarios where a vehicle enters a tunnel, a tree-lined road, or an urban road, or travels from outdoors to indoors, and is very practical. Moreover, different fusion positioning methods are adopted at different stages, which can effectively improve the positioning accuracy of the intelligent vehicle and provide guarantee for traveling safety of the intelligent vehicle.

2. The method of the present invention can solve the problem of an unstable positioning effect when the intelligent vehicle enters an GNSS blind area such as a tunnel, an urban road with densely distributed buildings, or a tree-lined road.

DETAILED DESCRIPTION OF THE EMBODIMENTS

The present invention discloses an intelligent vehicle positioning method based on feature point calibration, to maintain high positioning accuracy for a long time even in urban roads with densely distributed buildings, tree-lined roads, tunnels and other environments with poor GNSS signals. When the GNSS signal quality is good, vehicle-mounted odometer and IMU data are collected, and fused with a GNSS locating position by Kalman filtering to obtain a relatively accurate current position. At the same time, a laser radar continuously scans and observes a surrounding environment, extracts corner point and arc feature information in the environment, and fits the same into corner point and circle center coordinates. An intelligent vehicle continuously scans and calibrates feature points while traveling, to finally obtain stable and accurate coordinate values of the feature points, and converting the coordinate values to values in a global coordinate system for storage. When the GNSS signal quality becomes worse to seriously affect the positioning effect, the positioning method is changed into a particle filter method in which odometer and IMU data are used as prediction information, and the laser radar updates observed quantities of feature calibration points to obtain a relatively accurate vehicle locating position.

An IMU is an inertial measurement unit, which is a device for measuring a three-axis attitude angle (or angular speed) and an acceleration of an object. A gyroscope and an accelerometer are main elements of the IMU. An odometer includes photoelectric encoders on a left rear wheel and a right rear wheel respectively.

The technical solution of the present invention is further described in detail below in conjunction with the accompanying drawings.

Figure 1:
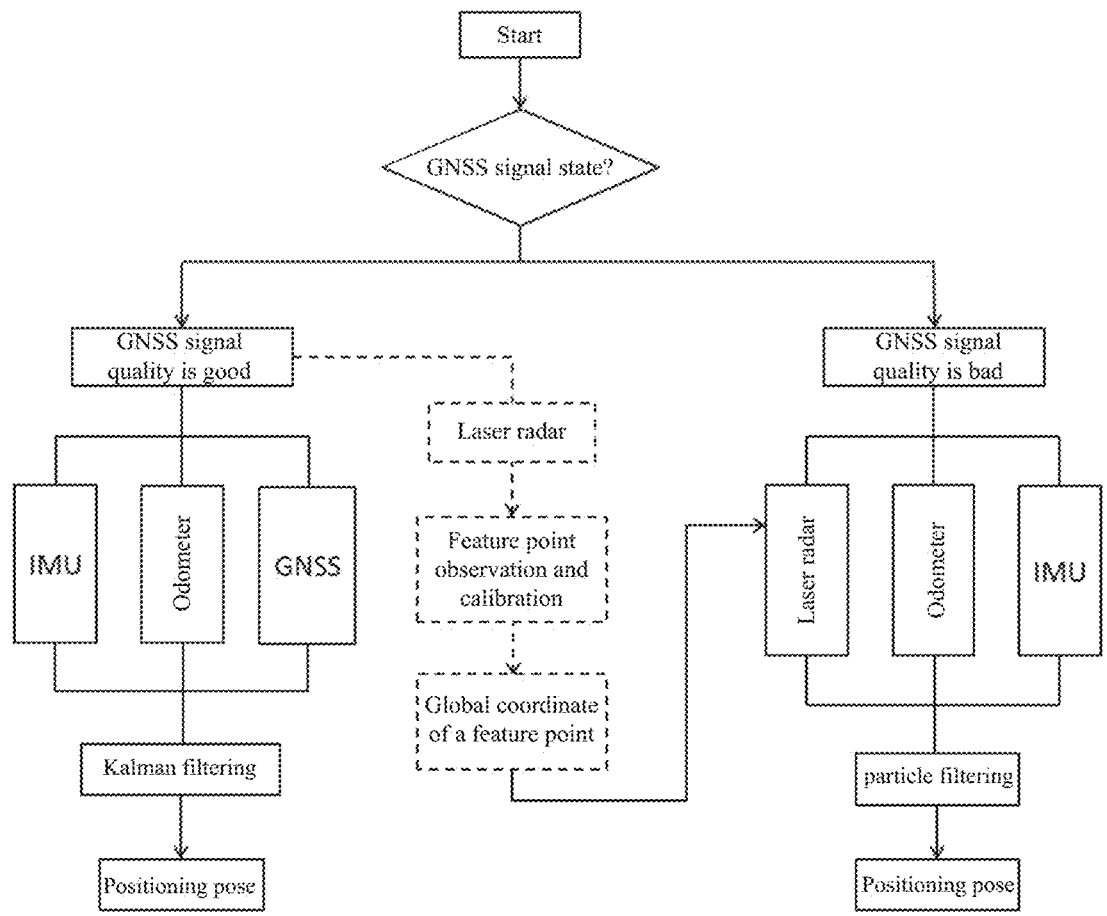
FIG. 1 is a flow diagram of an intelligent vehicle positioning method based on feature point calibration of the present invention.
Figure 2:
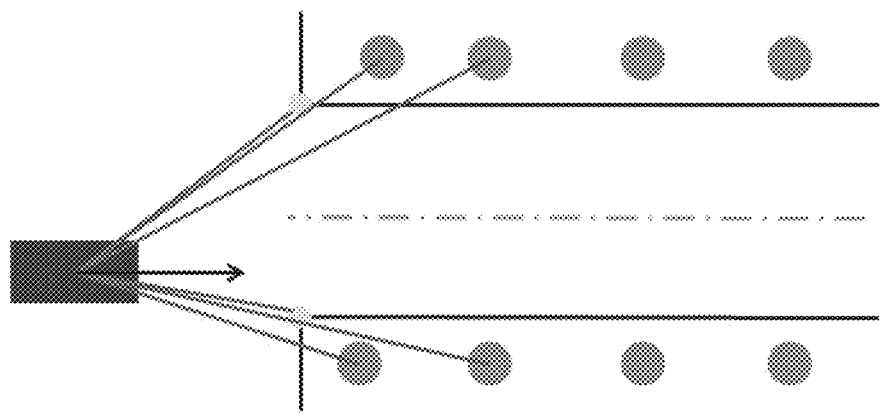
FIG. 2 is a schematic diagram illustrating that an intelligent vehicle observes and calibrates surrounding environment features by a laser radar in a good GNSS signal state.

As shown in FIG. 1, the present invention proposes an intelligent vehicle positioning method based on feature point calibration, including the following steps:

Step 1) As shown in FIG. 2, an intelligent vehicle normally travels on a road surface, and enters a tree-lined road after a period of time. In the case of good GNSS signal quality, during normal traveling of the intelligent vehicle on the road, curbs, trunks of trees on both sides and other static objects with obvious features are observed by using a laser radar, and corner points and arc features are extracted and processed to obtain corner points and circle centers as feature point coordinates. After multiple observations and calibrations, the coordinates are added to a trusted list. After coordinate conversion, the coordinates are stored in a global coordinate system (geodetic coordinate system) for use. When the vehicle enters a GNSS blind area, they are used as absolute coordinate points to provide a guiding observed quantity for the laser radar. The specific process is as follows:

(1.1) A preprocessing process of laser radar data. Original point cloud data obtained during traveling must be processed in advance, which can greatly simplify subsequent work. The specific process is as follows:

(1.1.1) Removal of noise points. Individual noise points in a point cloud are removed according to a pre-designed point cloud density threshold.

(1.1.2) Clustering of scanning points. The point cloud is segmented into different point cloud clusters according to a Euclidean distance threshold between each point.

(1.2) A feature point determination and coordinate calculation process, specifically including the following steps:

(1.2.1) First, arc features are determined and processed. An arc feature determination and circle center coordinate calculation process is as follows:

(1.2.1.1) A circle feature is extracted based on a Hough transform mechanism. For a certain point cloud cluster, each point casts a vote on a certain circle parameter through Hough transform, which is expressed by a formula: $(x-a)^2+(y-b)^2=R^2$. Constraints are added: a. the number of votes is greater than a threshold; and b. the diameter of a composite circle is greater than a threshold. A circle parameter that meets both the above two constraints is used as an observable arc feature.

(1.2.1.2) Center coordinates and weight are determined according to the obtained arc feature. a vote number weigh is defined: $w_1{}^r=1/N$, where N is the number of votes obtained for the circle feature, and an arc weight $w_2{}^r=\alpha/2\pi$, where $\alpha$ is a central angle corresponding to an arc formed by scanning points and is expressed by a formula α=arcsin(L/2R), and L is a chord length obtained by connecting two ends of the arc, and if a distance from a point in the arc to the chord is greater than R, the corresponding central angle is greater than π, and in this case α=2π−arcsin (L/2R) Finally, the circle center coordinate weight is obtained: $w^r = w_1^r \times w_2^r$.

(1.2.2) A determination and calculation process of a corner point feature as one type of feature point is as follows:

(1.2.2.1) Breakpoint detection. In a point cloud cluster, if a distance between one point and the next point is greater than a breakpoint detection threshold, then the two points are considered as breakpoints.

(1.2.2.2) Corner point determination. After the point cloud cluster further segmented by the breakpoints is obtained, a starting point and an end point of a segment of point cloud cluster $S_i$ are connected to obtain a straight line l, a distance from each point in the point cloud cluster to the straight line l is calculated, and a point $K_j$ with the largest distance is found, and if the distance $d_j$ from the point to l is greater than a set threshold $d_{max}$, the point is considered as a corner point, and the point cloud cluster $S_i$ is segmented into two sub-point cloud clusters using the point as a dividing point, and then the above-mentioned corner point determination process is executed on the two segmented point cloud clusters respectively, until corner points in all point cloud clusters are found. At the same time, two constraints are added: a. distances from the corner point to end points of straight lines on both sides are greater than a certain threshold; and b. the numbers of scanning points of the straight lines on both sides are greater than a set value. Corner points that do not meet the above two constraints are removed.

(1.2.2.3) Straight line feature parameter Estimation. The sub-point cloud clusters on both sides of the corner point obtained in the previous step are fit into straight lines and by using a least square method, wherein a cost function in a fitting process is:

$$J(\alpha, \rho) = \min \Sigma(\rho - x_i \cos \alpha - y_i \sin \alpha)^2$$

In the formula, ρ is a vertical distance from an origin of a local coordinate system of the vehicle body to the straight line, α is an included angle between an x axis of the coordinate system and a normal of the straight line, and ($x_i$, $y_i$) is coordinates of the ith scanning point in the local coordinate system. A parameter $\varepsilon = var(\Delta\rho_1, \Delta\rho_2, \ldots, \Delta\rho_N)$ is used to measure an error of a straight line feature parameter, where $\Delta\rho_m$ represents a vertical distance from a scanning point in the straight line to the straight line, and a weight of the straight line is defined as $$w = \frac{1}{\varepsilon}$$

for subsequent calculation of a weight of a corner point.

(1.2.2.4) Fitting and intersection finding to obtain corner point coordinates and weight. After straight line feature parameters of the straight lines are obtained, an intersection point of the straight lines is found to obtain coordinates of the corner point in the local coordinate system. A weight of the coordinates of the corner point is obtained: $w^c = w_1^c \times w_2^c$, where $w_1^c$, $w_2^c$ are respectively weights of the straight lines on two sides thereof.

(1.2.3) After the coordinates ($x_L$, $y_L$) of the feature points in the local coordinate system of the vehicle body are obtained in the previous step, coordinate conversion is performed to obtain coordinates ($x_G$, $y_G$) in a global coordinate system (geodetic coordinate system), and the coordinates together with the weights are stored in the current feature point list; a conversion formula is:

$$\begin{cases} x_G = x_0 + x_L\cos\theta - y_L\sin\theta \\ y_G = y_0 + x_L\sin\theta + y_L\cos\theta \end{cases}$$

where ($x_0$, $y_0$) is coordinates of the intelligent vehicle in the global coordinate system, obtained by positioning using a GNSS in combination with multiple sensors.

(1.3) Repeated calibrations and corrections of feature points

The feature points are recorded in a trusted list and an existing feature point list. Each column of the existing feature point list records one feature point, including multiple recorded coordinates and weights. The trusted list stores corrected coordinates and weights of the feature points.

Figure 3:
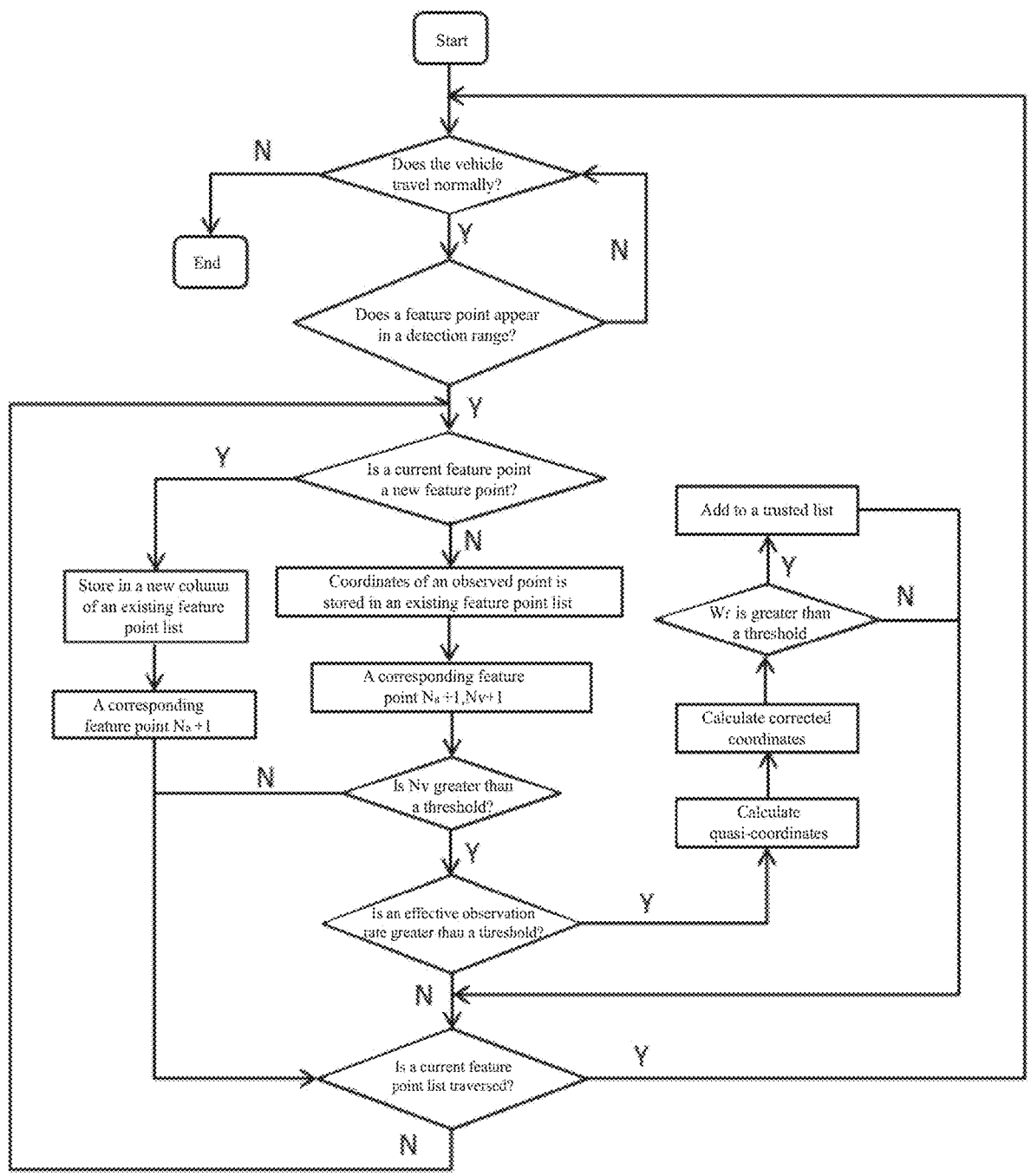
FIG. 3 is a flow diagram of repeated calibrations and corrections of feature points.

As shown in FIG. 3, specific steps are as follows:

(1.3.1) A feature point observation range is determined according to the type of laser radar used, and a feature point determination and calibration process can be performed only in a relatively high detection precision range.

(1.3.2) A weighted average of all recorded coordinates of any column in the existing feature point list is calculated as quasi-coordinates $X_s$ of a feature point in the column:

$$X_s = \sum_{f=1}^{F} w_f Z_f$$

where a subscript f represents a recorded coordinate serial number of the feature point, $Z_f$ is recorded coordinates, and $w_f$ is a corresponding weight.

A feature point is taken from the current feature point list and matched with the existing feature point list. If a distance between the feature point and quasi-coordinates in a column of the existing feature point list is less than a threshold, the matching is considered as successful, and coordinate and weight information of the feature point is added to the column, and step (1.3.3) is performed. If the matching is unsuccessful, the feature point is considered as a new feature point, a new column is created in the existing feature point list, and the new feature point is saved.

(1.3.3) A total number of observations $N_A$ is defined as a total number of scans of the surrounding environment since the laser radar scanned a certain feature point, an effective number of observations $N_V$ is defined as a total number of successful matches of the certain feature, and an effective observation rate is defined as $N_V/N_A \times 100\%$. If the feature point meets conditions that $N_V$ greater than a threshold and the effective observation rate is greater than a threshold, preparation is made to add the feature point to the trusted list.

(1.3.4) The number of optimal estimation points is defined as $N = N_V \times \beta$, where, β in the formula is an optimal estimation rate, and the quasi-coordinates after new recorded coordinates are added are re-calculated.

$$X_s = \sum_{f=1}^{F+1} w_f Z_f$$

The nearest N points from Xs are taken and a weighted average is calculated again to obtain modified coordinates:

$$X_F = \sum_{n=1}^{N} w_f Z_f$$

a weight is $w_F=1/\varepsilon_V$, where $\varepsilon_V$ is a distribution variance of the optimal estimation point, and at the same time $\varepsilon_V$ is amplified, and feature point coordinates outside an amplified distribution range are removed.

Figure 4:
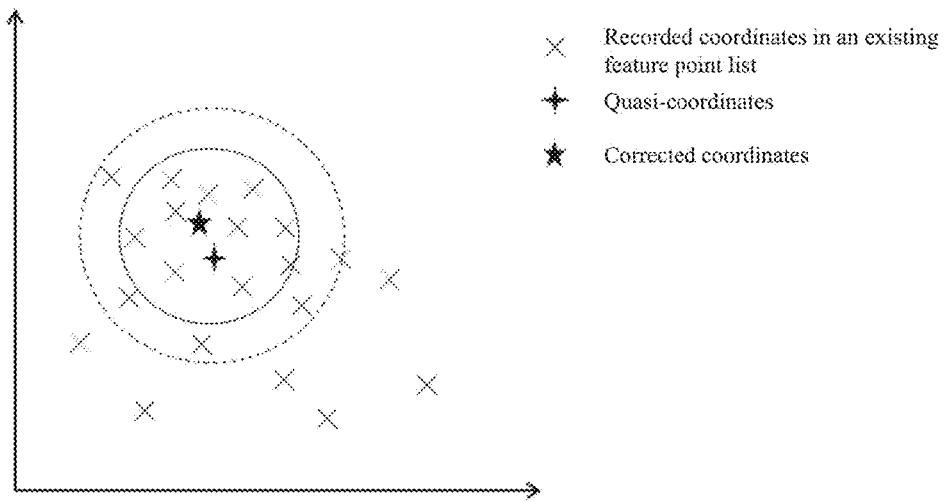
FIG. 4 is schematic diagram of calculating coordinates of a trusted calibrated point based on coordinates of an observed point.

(1.3.5) After a repeated calibration and modification process, if a certain feature $w_F$ is observed to be greater than a threshold, the modified coordinates $X_F$ and weight $w_F$ of the feature point are added to the trusted list, and positions and weights thereof are continuously updated according to steps (1.3.3) and (1.3.4) to be used as a trusted feature point when the GNSS signal quality becomes worse, as shown in FIG. 4.

Figure 5:
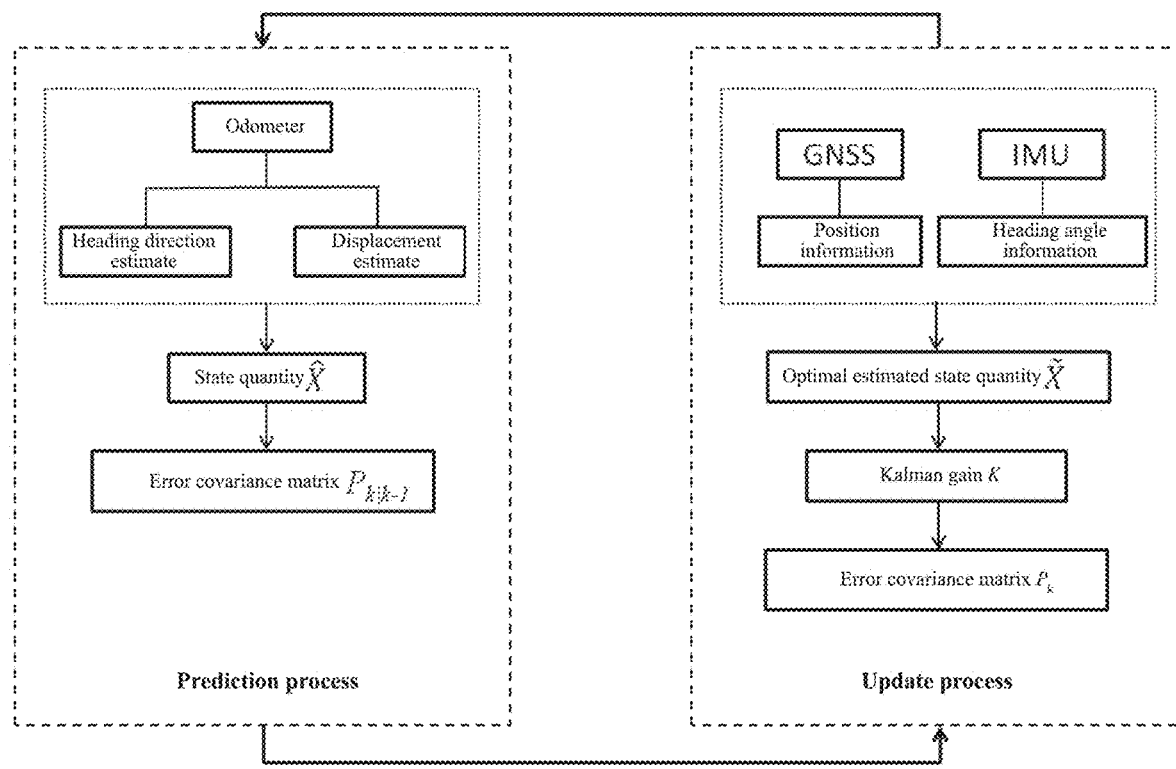
FIG. 5 is a process diagram of fusion positioning through Kalman filtering by multiple sensors.

Step 2) GNSS information, odometer data and IMU data are combined, and a current pose of the intelligent vehicle in the global coordinate system is acquired by Kalman filtering, as shown in FIG. 5. A specific process is as follows.

(2.1) A local coordinate system of the vehicle body is established by using the center of the vehicle body when the intelligent vehicle is started as an origin $O_G$, a forward direction of the intelligent vehicle as an $X_G$ axis direction, a direction perpendicular to the $X_G$ axis and oriented to the left of the vehicle body as a $Y_G$ axis direction, and a vertically upward direction as a $Z_G$ axis direction. In this method, a coordinate system of the mounted odometer and IMU inertial unit has been converted to the local coordinate system of the vehicle body in advance, and a time clock of each sensor has been calibrated, and only movement of the intelligent vehicle in the horizontal plane is considered without pitching and rolling motion. Thus, the $Z_G$ axis coordinate is always 0 and only the yaw angle changes. Kalman filtering fusion is performed on the odometer, IMU and GNSS information to obtain the current pose (x, y, θ) of the intelligent vehicle in the global coordinate system, where θ is a heading angle, i.e. an included angle between a current heading direction of the vehicle and a positive direction of the X axis.

(2.2) Displacement and heading angle changes of the intelligent vehicle are calculated by photoelectric encoders on a left rear wheel and a right rear wheel of the intelligent vehicle, a specific process of which is as follows:

(2.2.1) At a moment $t_0$, a pose $(x_0, y_0, \theta_0)$ of the intelligent vehicle in the coordinate system is (0, 0, 0).

(2.2.2) Position increments $\Delta d_L$ and $\Delta d_R$ of the left rear wheel and the right rear wheel in unit sampling time $T_S$ are calculated:

$$\Delta d_L = \frac{\Delta N_L * \pi * D}{P * T_S * m}$$

$$\Delta d_R = \frac{\Delta N_R * \pi * D}{P * T_S * m}$$

where $\Delta N_L$ and $\Delta N_R$ are respectively pulse increments in the sampling time of the left rear wheel and the right rear wheel, D is an equivalent diameter of the wheel, P is a total number of gratings of an optical code disc, and m is a deceleration rate of the encoder;

(2.2.3) A displacement change $\Delta D_k$ and a heading angle change $\Delta \theta_k^{WO}$ of the intelligent vehicle from a moment $t_{k-1}$ to a moment $t_k$ are calculated:

$$\Delta D_k = \frac{\Delta d_R + \Delta d_L}{2},$$

$$\Delta \theta_k^{WO} = \frac{\Delta d_R - \Delta d_L}{W}$$

In the formula, W is an axial length of the two rear wheels; and the superscript WO represents a data source: odometer;

(2.2.4) A speed at the moment $t_k$ is calculated:

$$V_k = \frac{\Delta D_k}{T_s}$$

(2.3) A heading angular acceleration $\omega_k$ may be directly obtained from the IMU at the moment $t_k$, and the angular acceleration $\omega_k$ at each moment is further integrated to obtain a heading angle change $\Delta \theta_k^{IMU}$, where the heading angle $\theta_k^{IMU} = \theta_{k-1} + \Delta \theta_k^{IMU}$.

(2.4) The GNSS information collected by the intelligent vehicle is converted into coordinates in the global coordinate system, Gaussian projection is performed at an original longitude and latitude $(\phi, \lambda)$ in a WGS-84 coordinate system, and the coordinates are converted to an earth-centered, earth-fixed coordinate system and then converted to the local coordinate system of the vehicle body to obtain a vehicle position$(x_k^{GNSS}, y_k^{GNSS})$ at the moment $t_k$.

(2.5) The above information is fused by a Kalman filter; a state of the intelligent vehicle at the moment $t_{k-1}$ is defined as: $X_{k-1} = [x_{k-1}, y_{k-1}, V_{k-1}, \theta_{k-1}, \omega_{k-1}]^T$, motion and observation models are respectively:

$$\hat{X}_k = f(X_{k-1}) + c_k, \, c_k \sim N(0, Q),$$

$$\hat{z}_k = h(\hat{X}_k) + v_k, \, v_k \sim N(0, R)$$

and a state transition function of a movement process is:

$$f(x_{k-1}) = \begin{bmatrix} x_{k-1} + \frac{\Delta D_k}{\Delta \theta_k^{WO}}(\sin(\theta_{k-1} + \Delta \theta_k^{WO}) - \sin\theta_{k-1}) \\ y_{k-1} - \frac{\Delta D_k}{\Delta \theta_k^{WO}}(\cos(\theta_{k-1} + \Delta \theta_k^{WO}) - \cos\theta_{k-1}) \\ V_k \\ \theta_{k-1} + \Delta \theta_k^{WO} \\ \omega_k \end{bmatrix}$$

where $\hat{X}_k = [\hat{x}_k, \hat{y}_k, \hat{V}_k, \hat{\theta}_k, \hat{\omega}_k]$ is a predicted state of the intelligent vehicle at the moment $t_k$, $h(\hat{X}_k)$ is an observation model transfer function, and $\hat{z}_k$ is an observed quantity with a noise added; $c_k$ is a system process noise with a covariance of Q, and $v_k$ is a sensor measurement noise with a covariance of R; both noise matrices are Gaussian distribution white noises; an initial value of the system process noise $c_k$ may be set according to empirical values, and the sensor measurement noise $v_k$ may be adaptively adjusted according to the quality of the odometer, IMU, and GNSS equipment.

A filter prediction and update process is as follows:

a state quantity is predicted: $\hat{X}_{(k|k-1)}=A\tilde{X}_{k-1}$;

an error covariance matrix is predicted: $P_{(k|k-1)}=AP_{k-1}A^T+Q$;

an optimal estimated state quantity is updated: $\tilde{X}_{(k)}=\hat{X}_{(k|k-1)}+K_k[z_k-H\hat{X}_{(k|k-1)}]$;

a Kalman gain is updated:

$$K_k = \frac{P_{(k|k-1)}H^T}{[HP_{(k|k-1)}H^T + R]};$$

and the error covariance matrix is updated: $P_k=[I-K_k H]P_{(k|k-1)}$
where $\hat{X}_{(k|k-1)}$ is a predicted pose state quantity at the moment $t_k$, A is a state transition matrix, $\tilde{X}_{k-1}$ is an optimal pose state quantity at the moment $t_{k-1}$, $P_{k-1}$ is an updated error covariance matrix at the moment $t_{k-1}$, $K_k$ is a Kalman gain at the moment $t_k$, H is a measurement matrix, and an observed quantity is $z_k=[x_k^{GNSS}, y_k^{GNSS}, V_k, \theta_k^{IMU}, \omega_k]$; and $\tilde{X}_k$ is an optimal pose state quantity at the moment $t_k$. During traveling the intelligent vehicle, the above prediction and update process is repeated to accomplish the Kalman filtering process, and finally obtain a more accurate current position of the vehicle.

Step 3) When the intelligent vehicle enters a tree-lined road, the number of locked-on GNSS satellites decreases and the GNSS signals are unstable. The GNSS signal quality is determined based on the number of locked-on GNSS satellites to determine to the timing of positioning mode changeover. When the number of locked-on satellites is greater than 14, the GNSS is used for positioning through Kalman filtering in combination with multiple sensors. When the number of locked-on satellites is less than 14, it is considered that the intelligent vehicle enters an area with poor GNSS signal quality and the GNSS signals are unavailable, so it switches to particle filter positioning by using the laser radar in combination with multiple sensors.

Figure 6:
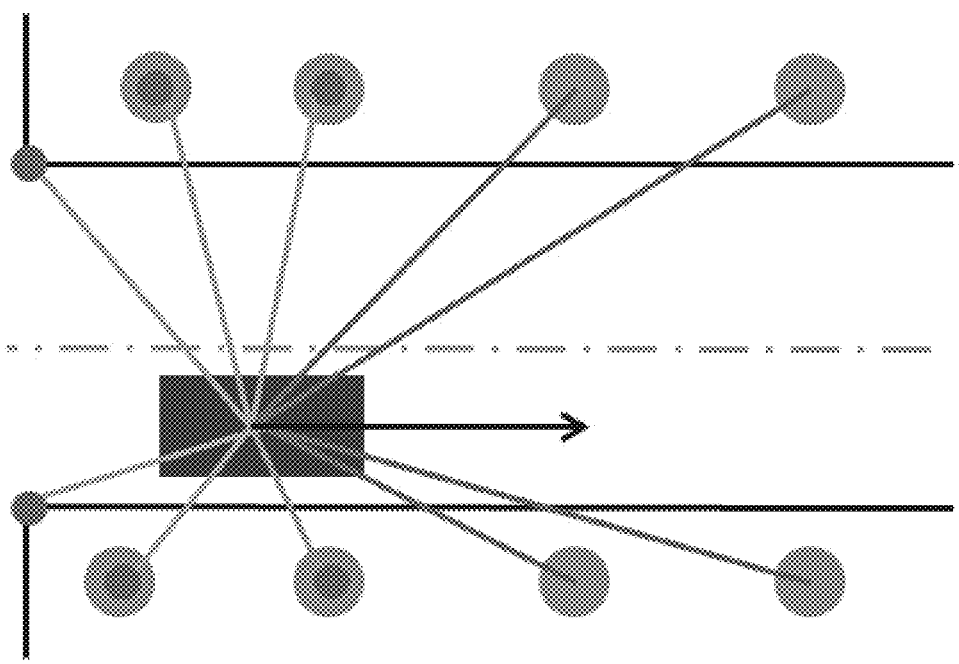
FIG. 6 is a schematic diagram of positioning by observing a trusted calibrated point after the intelligent vehicle enters a tree-lined road.
Figure 7:
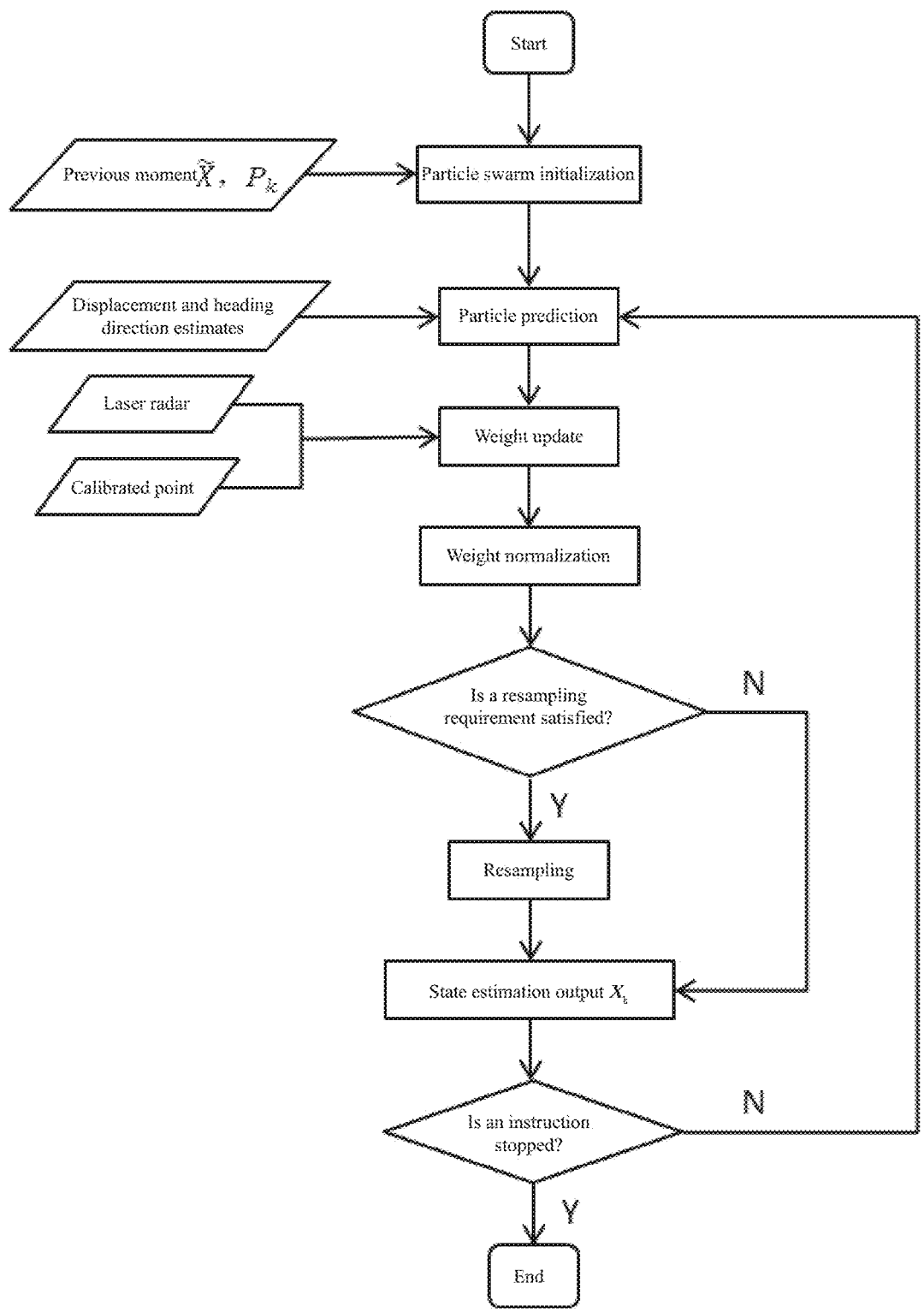
FIG. 7 is a process diagram of fusion positioning through Kalman filtering by multiple sensors in a GNSS blind area.

(4) As shown in FIG. 6, after the intelligent vehicle enters the tree-lined road, the GNSS signal quality becomes worse. It is considered that the intelligent vehicle enters a blind area of the GNSS. Trusted environment feature points are observed by using the laser radar to provide a guiding observed quantity, and odometer and IMU information is fused, and a simply deduced reckoning positioning result is corrected by the particle filtering method to obtain a current pose of the intelligent vehicle. A specific process is as follows:

(4.1) Particle swarm initialization.

A local coordinate system of the vehicle body is established like in step (2.1) to achieve seamless transition of positioning. Using an optimal pose $\tilde{X}_0=(x_0, y_0, \theta_0)$ at a moment before the intelligent vehicle enters the GNSS blind area as an initial distribution of a particle swarm, a probability density function is constructed as a proposal distribution $\tilde{q}$ by $\tilde{X}_0$ and an error covariance matrix $P_0$, and Mc initial particles are randomly selected, a Gaussian distribution is created for the particles around $(x_0, y_0, \theta_0)$ in the proposal distribution, $\tilde{q}$, then the state of the ith particle at the moment $t_k$ is expressed as $X_k^i=[x_k^i, y_k^i, \theta_k^i]^T$, and a weight thereof is $w_0^i=1/M$.

(4.2) A particle prediction process.

At the moment $t_k$, a pose distribution of the particles at the moment $t_k$ is calculated according to control information $u_k$ of the intelligent vehicle, that is, particle displacement and heading direction estimates are obtained according to odometer and IMU information. The odometer information is acquired like in step (2.2), to obtain $\Delta D$ and $\Delta\theta_k^{WO}$. The angular acceleration in the IMU is further integrated to obtain $\Delta\theta_k^{IMU}$. The equation of motion is $X_k^i=g(X_{k-1}^i)+d_{k-1}$, $d_{k-1}\sim N(0, Q_1)$, where the state transfer function is:

$$g(x_{k-1}^i) = \begin{bmatrix} x_{k-1}^i + \frac{\Delta D_k}{\Delta\theta_k^{WO}}(\sin(\theta_{k-1}^i + \Delta\theta_k^{WO}) - \sin\theta_{k-1}^i) \\ y_{k-1}^i - \frac{\Delta D_k}{\Delta\theta_k^{WO}}(\cos(\theta_{k-1}^i + \Delta\theta_k^{WO}) - \cos\theta_{k-1}^i) \\ \theta_{k-1}^i + \Delta\theta_k^{IMU} \end{bmatrix}$$

In the formula, $d_{k-1}$ is a system process noise with a covariance of $Q_1$.

(4.3) Feature point recognition and matching.

Based on a predicted state $X_k^i=[x_k^i, y_k^i, \theta_k^i]^T$ of the ith particle obtained after step 3-2) at the moment $t_k$, establishing a local coordinate system of the ith particle by using a predicted position $(x_k^i, y_k^i)$ of the ith particle as an origin, a forward direction of the intelligent vehicle as an X direction, a direction perpendicular to the X axis and oriented to the left of the vehicle body as a Y axis direction, and a vertically upward direction as a Z axis.

x, y axial distances $\Delta x_j^i$ and $\Delta y_j^i$ of the feature points in the trusted list and the particles in the global coordinate system are calculated one by one, where the subscript represents the jth feature point, and the superscript represents the ith particle; a Euclidean distance $\Delta O_j^i=\sqrt{(\Delta x_j^i)^2+(\Delta y_j^i)^2}$ is further calculated, and if the distance is less than a high-precision detection range of the laser radar, the jth feature point is within the detection range, the feature point is stored in a comparison list, and a sequence number n is re-assigned to represent a sequence thereof, thus obtaining a total of N feature points that meet the requirement; and a distance in the global coordinate system corresponding to the nth feature point is converted to a distance in the local coordinate system of the ith particle:

$$\begin{cases} \Delta x_n^{i'} = \Delta x_n^i \cos\theta_i^k + \Delta y_n^i \sin\theta_i^k; \\ \Delta y_n^{i'} = \Delta x_n^i \sin\theta_i^k + \Delta y_n^i \cos\theta_i^k; \end{cases}$$

where $\Delta x_n^{i'}$ and $\Delta y_n^{i'}$ are a predicted observed quantity of the nth feature point for the ih particle.

At the current moment $t_k$, the surrounding environment is scanned by the laser radar, circle centers and corner points are detected, and feature point coordinates $(x_q, y_q)$ in the local coordinate system of the vehicle body are calculated and stored in the current feature point list, where q represents a serial number and $(x_q, x_q)$ is an observed quantity thereof, and the total number of current feature points is $q_{max}$.

Differences $\Delta\bar{x}_{nq}^i$ and $\Delta\bar{y}_{nq}^i$ between the observed quantity corresponding to the feature point coordinates in the current feature point list and the predicted observed quantity of the nth calibration point for the ith particle in the comparison list are calculated one by one; and $$\begin{cases} \Delta \bar{x}_{nq}^i = \Delta x_n^{i'} - x_q \\ \Delta \bar{y}_{nq}^i = \Delta y_n^{i'} - y_q \end{cases}$$

Finally, simultaneous equations are formed by a nearest neighbor method: a minimum value $$\min\left(\sqrt{(\Delta \bar{x}_{nq}^i)^2 + (\Delta \bar{y}_{nq}^i)^2}, q = 1, 2 \ldots q_{max}\right)$$

of the feature point n in the comparison list is calculated, a corresponding serial number $q_0$ of the minimum value is calculated, thus forming simultaneous equations of n and $q_0$, with a corresponding error $\Delta \bar{x}_{nq_0}^i$ and $\Delta \bar{y}_{nq_0}^i$, denoted by $\Delta \bar{x}_n^i$ and $\Delta \bar{y}_n^i$, the comparison list is traversed and the process is executed to accomplish feature point recognition and matching.

(4.4) Weight update.

Weights of the particles are updated according to the difference between the observed quantity and the predicted observed quantity:

$$w_k^i = w_{k-1}^i \prod_{n=1}^{N} \frac{1}{2\pi\sigma_x\sigma_y} e^{-\frac{1}{2}\left(\left(\frac{\Delta \bar{x}_n^i}{\sigma_x}\right)^2 + \left(\frac{\Delta \bar{y}_n^i}{\sigma_y}\right)^2\right)} \cdot w_F^n$$

where N represents the number of feature points matching the current surrounding environment of the intelligent vehicle from the trusted list, $\sigma_x$ and $\sigma_y$ represent measurement variances of the laser radar, and $w_F^n$ represent weights of the feature points.

(4.5) Weight normalization, which is performed by a formula $$\tilde{w}_k^i = \frac{w_k^i}{\sum_{i=1}^{M} w_k^i}.$$

(4.6) Resampling. The number of effective particles $$\tilde{N}_{eff} = \frac{1}{\sum_{i=1}^{M} \tilde{w}_k^i}$$

is calculated. If $N_{eff}$ is less than a threshold, a resampling process is performed, in which a low-variance resampling is used for sampling, and particles with larger weights are more likely to be retained, and all particle weights are normalized to 1/M after resampling is completed. Otherwise, step (4.7) is executed.

(4.7) State estimation output.

At the moment $t_k$, a system state estimation value is $$X_k = \sum_{i=1}^{M} \tilde{w}_k^i X_k^i,$$

to obtain a current locating position of the vehicle. Step (4.2) to this step are repeated to accomplish a particle filtering and positioning process.

Finally, it should be noted that the above embodiments are only used for describing instead of limiting the technical solutions of the present invention. Although the present invention is described in detail with reference to the embodiments, persons of ordinary skill in the art should understand that modifications or equivalent substitutions of the technical solutions of the present invention should be encompassed within the scope of the claims of the present invention so long as they do not depart from the spirit and scope of the technical solutions of the present invention.

What is claimed is:

1. An intelligent vehicle positioning method based on a feature point calibration, comprising:

determining a global navigation satellite system (GNSS) signal quality according to a number of locked-on GNSS satellites, and determining whether an intelligent vehicle is in a GNSS blind area or a GNSS non-blind area according to the GNSS signal quality;

when the intelligent vehicle is located in the GNSS non-blind area, combining GNSS signals, odometer data and inertial measurement unit data, acquiring a current pose of the intelligent vehicle through a Kalman filtering, meanwhile scanning a surrounding environment of the intelligent vehicle by using a laser radar, extracting corner points and arc features and performing processing to obtain the corner points and circle centers as feature points, calculating global coordinates and weights of the feature points and storing the global coordinates and the weights of the feature points in a current feature point list;

adding the feature points in the current feature point list into an existing feature point list, and adding feature points meeting conditions in the existing feature point list into a trusted list; and when the intelligent vehicle is located in the GNSS blind area, acquiring feature points of a surrounding trusted list as an observed quantity by using the laser radar, fusing the odometer data and the inertial measurement unit data, and acquiring the current pose of the intelligent vehicle by a particle filtering method and achieving positioning seamless switching of the intelligent vehicle entering the GNSS blind area from the GNSS non-blind area;

when the intelligent vehicle is in the GNSS non-blind area, the step of combining the GNSS signals, the odometer data and the inertial measurement unit data, acquiring the current pose of the intelligent vehicle through the Kalman filtering specifically comprises:

step 1, sub-step 1 comprises calculating a displacement change and a heading angle change of the intelligent vehicle by photoelectric encoders on a left rear wheel and a right rear wheel of the intelligent vehicle through the following steps:

calculating position increments $\Delta d_L$ and $\Delta d_R$ of the left rear wheel and the right rear wheel in a unit sampling time $T_S$ using the mathematical expression as follows:

$$\Delta d_L = \frac{\Delta N_L * \pi * D}{P * T_s * m}$$

$$\Delta d_R = \frac{\Delta N_R * \pi * D}{P * T_s * m}$$

where $\Delta N_L$ and $\Delta N_R$ are respectively pulse increments in the unit sampling time of the left rear wheel and the right rear wheel, D is an equivalent diameter of a wheel, P is a total number of gratings of an optical code disc, and m is a deceleration rate of the photoelectric encoder;

calculating the displacement change $\Delta D_k$ and the heading angle change $\Delta \theta_k^{WO}$ of the intelligent vehicle from a moment $t_{k-1}$ to a moment $t_k$ using the mathematical expression as follows:

$$\Delta D_k = \frac{\Delta d_R + \Delta d_L}{2},$$

$$\Delta \theta_k^{WO} = \frac{\Delta d_R - \Delta d_L}{W}$$

where W is an axial length of the left rear wheel and the right rear wheel;

calculating a speed at the moment $t_k$ using the mathematical expression as follows:

$$V_k = \frac{\Delta D_k}{T_s};$$

step 1, sub-step 2 comprises acquiring a heading angular acceleration $\omega_k$ directly from an inertial measurement unit (IMU) at the moment $t_k$, and further integrating the heading angular acceleration $\omega_k$ at each moment to obtain a second heading angle change $\Delta \theta_k^{IMU}$, where a heading angle is $\theta_k^{IMU} = \theta_{k-1} + \Delta \theta_k^{IMU}$;

step 1, sub-step 3 comprises performing a coordinate conversion on GNSS information collected by the intelligent vehicle to obtain a position $(x_k^{GNSS}, y_k^{GNSS})$ of the intelligent vehicle at the moment $t_k$;

step 1, sub-step 1 comprises fusing the GNSS information by a Kalman filter; defining a state of the intelligent vehicle at the moment $t_{k-1}$ as: $X_{k-1} = [x_{k-1}, y_{k-1}, V_{k-1}, \theta_{k-1} \omega_{k-1}]^T$, defining motion and observation models respectively as:

$$\hat{X}_k = f(X_{k-1}) + c_k, \ c_k \sim N(0, Q),$$

$$\hat{z}_k = h(\hat{X}_k) + v_k, \ v_k \sim N(0, R);$$

and defining a state transition function of a movement process as:

$$f(x_{k-1}) = \begin{bmatrix} x_{k-1} + \frac{\Delta D_k}{\Delta \theta_k^{WO}}(\sin(\theta_{k-1} + \Delta \theta_k^{WO}) - \sin\theta_{k-1}) \\ y_{k-1} - \frac{\Delta D_k}{\Delta \theta_k^{WO}}(\cos(\theta_{k-1} + \Delta \theta_k^{WO}) - \cos\theta_{k-1}) \\ V_k \\ \theta_{k-1} + \Delta \theta_k^{WO} \\ \omega_k \end{bmatrix};$$

where $\hat{X}_k = [\hat{x}_k, \hat{y}_k, \hat{V}_k, \hat{\theta}_k, \hat{\omega}_k]$ is a predicted state of the intelligent vehicle at the moment $t_k$, $h(\hat{X}_k)$ is an observation model transfer function, $\hat{z}_k$ is the observed quantity with a noise added, $c_k$ is a system process noise with a covariance of Q, and $v_k$ is a sensor measurement noise with a covariance of R;

acquiring the current pose of the intelligent vehicle based on the motion and observation models;

the Kalman filter is predicted and updated as follows:

predicting a state quantity: $\hat{X}_{(k|k-1)} = A\tilde{X}_{k-1}$;

predicting an error covariance matrix: $P_{(k|k-1)} = AP_{k-1}A^T + Q$;

updating an optimal estimated state quantity: $\tilde{X}_{(k)} = \hat{X}_{(k|k-1)} + K_k[z_k - H\hat{X}_{(k|k-1)}]$;

updating a Kalman gain:

$$K_k = \frac{P_{(k|k-1)}H^T}{[HP_{(k|k-1)}H^T + R]};$$

and updating the error covariance matrix: $P_k = [I - K_k H]P_{(k|k-1)}$;

where $\hat{X}_{(k|k-1)}$ is a predicted pose state quantity at the moment $t_k$, A is a state transition matrix, $\tilde{X}_{k-1}$ is an optimal pose state quantity at the moment $t_{k-1}$, $P_{k-1}$ is an updated error covariance matrix at the moment $t_{k-1}$, $K_k$ is a Kalman gain at the moment $t_k$, H is a measurement matrix, and the observed quantity is $z_k = [x_k^{GNSS}, y_k^{GNSS}, V_k, \theta_k^{IMU}, \omega_k]$; and $\tilde{X}_k$ is the optimal pose state quantity at the moment $t_k$;

the step of scanning the surrounding environment of the intelligent vehicle by using the laser radar, extracting the corner points and the arc features and performing processing to obtain the corner points and the circle centers as the feature points, calculating the global coordinates and the weights of the feature points and storing the global coordinates and the weights of the feature points in the current feature point list specifically comprises:

removing individual noise points in point cloud data acquired by the laser radar according to a pre-designed point cloud density threshold; and then segmenting a point cloud into different point cloud clusters according to a Euclidean distance threshold between each point;

extracting the arc features from the different point cloud clusters based on a Hough transform mechanism, and with corresponding circle centers of the arc features as the feature points, using coordinates of the circle centers as coordinates $(x_L, y_L)$ of the feature points in a local coordinate system of a vehicle body, and calculating the weights of the feature points;

detecting the corner points from the point cloud clusters as the feature points, using coordinates of the corner points as the coordinates $(x_L, y_L)$ of the feature points in the local coordinate system of the vehicle body, and calculating the weights of the feature points;

converting the coordinates $(x_L, y_L)$ of the feature points in the local coordinate system of the vehicle body to coordinates $(x_G, y_G)$ in a global coordinate system, and storing the coordinates $(x_G, y_G)$ together with the weights in the current feature point list;

the step of extracting the arc features from the point cloud clusters based on the Hough transform mechanism, and with the corresponding circle centers of the arc features as the feature points, using the coordinates of the circle centers as the coordinates $(x_L, y_L)$ of the feature points in the local coordinate system of the vehicle body, and calculating weights of the feature points specifically comprises:

for a certain point cloud cluster, each point casting a vote on a certain circle parameter through a Hough transform, wherein the certain circle parameter is expressed by a formula: $(x-a)^2+(y-b)^2=r^2$; adding a first constraint and a second constraint, wherein the first constraint is that a number of votes is greater than a first threshold; and the second constraint is that a diameter of a composite circle is greater than a second threshold; and using a circle parameter meeting the first constraint and the second constraint as an observable arc feature;

determining center coordinates and a weight according to an obtained arc feature:

defining a vote number weight $w_1^r=1/N$, where N is the number of votes obtained for a circle feature, and an arc weight $w_2^r=\alpha/2\pi$, where $\alpha$ is a central angle corresponding to an arc formed by scanning points and is expressed by a formula $\alpha=\arcsin(L/2r)$, and L is a chord length obtained by connecting two ends of the arc, and if a distance from a point in the arc to a chord is greater than r, a corresponding central angle is greater than $\pi$, and the corresponding central angle is $\alpha=2\pi-\arcsin(L/2r)$;

using a circle center corresponding to the arc as a feature point with the coordinates $(x_L, y_L)$ in the local coordinate system of the vehicle body, and the weight is $w_1^r \times w_2^r$;

the step of detecting the corner points from the point cloud clusters as the feature points, using the coordinates of the corner points as the coordinates $(x_L, y_L)$ of the feature points in the local coordinate system of the vehicle body, and calculating weights of the feature points specifically comprises:

detecting breakpoints in each point cloud cluster: if a distance between one point and the next point is greater than a breakpoint detection threshold, then considering the one point and the next point as the breakpoints; further segmenting the point cloud cluster by the breakpoints;

connecting a starting point and an end point of a segment of the point cloud cluster Si to obtain a straight line l, calculating a distance from each point in the point cloud cluster to the straight line l, and finding a point $K_p$ with a largest distance, and if the largest distance $d_p$ from the point $K_p$ to the straight line l is greater than a set threshold $d_{max}$, considering the point $K_p$ as a corner point, and segmenting the point cloud cluster $S_i$ into two sub-point cloud clusters using the point $K_p$ as a dividing point, and then executing a corner point determination process on two segmented point cloud clusters respectively, until the corner points in all point cloud clusters are found; meanwhile, adding a third constraint and a fourth constraint, wherein the third constraint is that distances from the corner point to end points of the straight line l and the straight line l on both sides are greater than a certain threshold; and the fourth constraint is that numbers of scanning points of the straight line l and the straight line l on both sides are greater than a set value; and removing the corner points without meeting the third constraint and the fourth constraint;

fitting the two sub-point cloud clusters on both sides of an obtained corner point into two straight lines $l_1$ and $l_2$ by using a least square method, wherein a fitting process of one of the straight line $l_1$ and the straight line $l_2$ is as follows:

designing a cost function:

$$J(\alpha, \rho) = \min \sum_{s=1}^{S} (\rho - a_s \cos\alpha - b_s \sin\alpha);$$

where $\rho$ is a vertical distance from an origin of the local coordinate system of the vehicle body to the straight line, $\alpha$ is an included angle between an x axis and a normal of the straight line, and $(a_s, b_s)$ is coordinates of an $s^{th}$ laser radar scanning point in the local coordinate system of the vehicle body; and a parameter $\varepsilon=\text{var}(\Delta\rho_1, \Delta\rho_2, \ldots, \Delta\rho_S)$ is used to measure an error of a straight line feature parameter, where $\Delta\rho_s$ represents a vertical distance from a scanning point in the straight line to the straight line, and $1 \leq s \leq S$; and a weight of the straight line is $$\frac{1}{\varepsilon};$$

finding an intersection point of the straight line $l_1$ and the straight line $l_2$ by using the straight line feature parameters, and using coordinates of the intersection point as the coordinates $(x_L, y_L)$ of the feature point in the local coordinate system of the vehicle body;

calculating a weight $w_1^c \times w_2^c$ of the feature point, where $w_1^c w_2^c$ are weights of the straight lines $l_1$ and $l_2$, respectively;

the step of adding the feature points in the current feature point list into the existing feature point list specifically comprises:

calculating a weighted average of all recorded coordinates of any column in the existing feature point list as quasi-coordinates $X_s$ of the feature point in a column:

$$X_s = \sum_{f=1}^{F} w_f Z_f;$$

where a subscript f represents a recorded coordinate serial number of the feature point, $Z_f$ is recorded coordinates, and $w_f$ is a corresponding weight;

taking the feature point from the current feature point list and matching the feature point with the existing feature point list, if a distance between the feature point and the quasi-coordinates in a column of the existing feature point list is less than a third threshold, considering a matching as successful, and adding coordinate and weight information of the feature point to the column; and if the matching is unsuccessful, considering the feature point as a new feature point, creating a new column in the existing feature point list, and saving the new feature point;

the step of adding the feature points meeting conditions in the existing feature point list into the trusted list specifically comprises:

step 2, sub-step 1 comprises, for a certain feature point in the existing feature point list, defining a total number of observations $N_A$ as a total number of scans of the surrounding environment since the laser radar scanned the certain feature point, defining an effective number of the observations $N_V$ as a total number of successful matches of the certain feature point, defining an effective observation rate as $N_V/N_A \times 100\%$, and if the feature point meets conditions where $N_V$ is greater than a fourth threshold and the effective observation rate is greater than a fifth threshold, preparing to add the feature point to the trusted list, defining a number of optimal estimation points $N=N_V \times \beta$, where $\beta$ is an optimal estimation rate, and re-calculating the quasi-coordinates after new recorded coordinates are added using the mathematical equation as follows:

$$X_s = \sum_{f=1}^{F+1} w_f Z_f;$$

taking nearest N points from $X_s$ and calculating a weighted average again to obtain modified coordinates:

$$X_F = \sum_{n=1}^{N} w_n Z_n;$$

calculating a weight $w_F = 1/\varepsilon_V$, where $\varepsilon_V$ is a distribution variance of the optimal estimation point, and meanwhile amplifying $\varepsilon_V$, and removing feature point coordinates outside an amplified distribution range;

if $w_F$ is greater than a sixth threshold, adding the modified coordinates $X_F$ and the weight $w_F$ of the feature point to the trusted list.

2. The intelligent vehicle positioning method of claim 1, wherein when the intelligent vehicle is located in the GNSS blind area, the step of acquiring the surrounding trusted feature points as the observed quantity by using the laser radar, fusing the odometer data and the inertial measurement unit data, and acquiring the current pose of the intelligent vehicle by the particle filtering method specifically comprises:

step 3, sub-step 1 comprises using an optimal pose $\tilde{X}_0 = (x_0, y_0, \theta_0)$ at a moment before the intelligent vehicle enters the GNSS blind area as an initial distribution of a particle swarm, constructing a probability density function by $\tilde{X}_0$ and an error covariance matrix $P_0$ as a proposal distribution $\tilde{q}$, randomly selecting M initial particles, creating a Gaussian distribution for the M initial particles around $(x_0, y_0, \theta_0)$ in the proposal distribution $\tilde{q}$, then expressing a state of an $i^{th}$ particle at the moment $t_k$ as $X_k^i = [x_k^i, y_k^i, \theta_k^i]^T$, and calculating a weight of the $i^{th}$ particle as $w_0^i = 1/M$;

step 3, sub-step 2 comprises performing a particle prediction process to obtain displacement and heading direction of the intelligent vehicle using the mathematical expression as follows:

at the moment $t_k$, using an equation of a motion $X_k^i = g(X_{k-1}^i) + d_{k-1}$, $d_{k-1} \sim N(0, Q_1)$, wherein a state transition function is:

$$g(x_{k-1}^i) = \begin{bmatrix} x_{k-1}^i + \frac{\Delta D_k}{\Delta \theta_k^{WO}}(\sin(\theta_{k-1}^i + \Delta \theta_k^{WO}) - \sin\theta_{k-1}^i) \\ y_{k-1}^i - \frac{\Delta D_k}{\Delta \theta_k^{WO}}(\cos(\theta_{k-1}^i + \Delta \theta_k^{WO}) - \cos\theta_{k-1}^i) \\ \theta_{k-1}^i + \Delta \theta_k^{IMU} \end{bmatrix};$$

where $d_{k-1}$ in the formula is the system process noise of a covariance matrix $Q_1$;

step 3, sub-step 3 comprises acquiring current feature points of the surrounding environment of the intelligent vehicle as the observed quantity by using the laser radar, meanwhile performing the matching on the feature points from the trusted list, calculating a predicted observed quantity of matched feature points for the M initial particles, and calculating a difference between the predicted observed quantity and the observed quantity;

step 3, sub-step 4 comprises updating weights of the M initial particles according to the difference between the predicted observed quantity and the observed quantity using the mathematical expression as follows:

$$w_k^i = w_{k-1}^i \prod_{n=1}^{N} \frac{1}{2\pi\sigma_x\sigma_y} e^{-\frac{1}{2}\left(\left(\frac{\Delta \bar{x}_n^i}{\sigma_x}\right)^2 + \left(\frac{\Delta \bar{y}_n^i}{\sigma_y}\right)^2\right)} \cdot w_F^n;$$

where N is the number of the feature points matching a current surrounding environment of the intelligent vehicle from the trusted list, $\sigma_x$ and $\sigma_y$ represent measurement variances of the laser radar, and $w_F^n$ represent the weights of the feature points, and $\Delta \bar{x}_n^i$ and $\Delta \bar{y}_n^i$ are errors of the predicted observed quantity and the observed quantity of an $n^{th}$ feature point for the $i^{th}$ particle, and $1 \leq n \leq N$, steps 3, sub-step 5 comprises normalizing the weights using the mathematical expression as follows:

$$\tilde{w}_k^i = \frac{w_k^i}{\sum_{i=1}^{M} w_k^i};$$

step 3, sub-step 6 comprises calculating a number of effective particles weights using the mathematical expression as follows:

$$\tilde{N}_{eff} = \frac{1}{\sum_{i=1}^{M} \tilde{w}_k^i};$$

if $\tilde{N}_{eff}$ is less than the threshold, performing a resampling process, wherein a low-variance resampling is used for a sampling, and particles with larger weights are retained in the resampling process, and normalizing all particle weights to 1/M after resampling is completed; otherwise, proceeding to step 3, sub-step 7;

step 3, sub-step 7 comprises performing state estimation output at the moment $t_k$, by calculating a state estimation value $$X_k = \sum_{i=1}^{M} \tilde{w}_k^i X_k^i$$

to obtain the current pose of the intelligent vehicle.

3. The intelligent vehicle positioning method of claim 2, wherein the step of acquiring the current feature points of the surrounding environment of the intelligent vehicle as the observed quantity by using the laser radar, meanwhile performing the matching on the feature points from the trusted list, calculating the predicted observed quantity of the matched feature points for the M initial particles, and calculating the difference between the predicted observed quantity and the observed quantity specifically comprises;

based on the predicted state $X_k^i=[x_k^i, y_k^i, \theta_k^i]^T$ of the $i^{th}$ particle obtained after step 3, sub-step 2 at the moment $t_k$, establishing the local coordinate system of the $i_{th}$ particle by using a predicted position $(x_k^i, y_k^i)$ of the $i^{th}$ particle as an origin, a forward direction of the intelligent vehicle as an X direction, a direction perpendicular to the X axis and oriented to a left of the vehicle body as a Y axis direction, and a vertically upward direction as a Z axis;

calculating x, y axial distances $\Delta x_j^i$ and $\Delta y_j^i$ of the feature points in the trusted list and the M initial particles in the global coordinate system one by one, where a subscript represents a $j^{th}$ feature point, and a superscript represents the $i^{th}$ particle; further calculating a Euclidean distance $\Delta O_j^i=\sqrt{(\Delta x_j^i)^2+(\Delta y_j^i)^2}$, and if the Euclidean distance is less than a high-precision detection range of the laser radar, determining the $j^{th}$ feature point is within the high-precision detection range, storing the feature point in a comparison list, and re-assigning a sequence number n to represent a sequence of the feature point, obtaining a total of N feature points meeting a requirement within the high-precision detection range of the laser radar; and converting a distance in the global coordinate system corresponding to the $n^{th}$ feature point to a distance in the local coordinate system of the $i^{th}$ particle:

$$\begin{cases} \Delta x_n^{i'} = \Delta x_n^i \cos\theta_i^k + \Delta y_n^i \sin\theta_i^k; \\ \Delta x_n^{i'} = \Delta x_n^i \cos\theta_i^k + \Delta y_n^i \sin\theta_i^k; \end{cases}$$

where $\Delta x_n^{i'}$ and $\Delta y_n^{i'}$ are the predicted observed quantity of the $n^{th}$ feature point for the $i^{th}$ particle;

at the moment $t_k$, scanning the surrounding environment by the laser radar, detecting the circle centers and the corner points and calculating the feature point coordinates $(x_q, y_q)$ in the local coordinate system of the vehicle body, and storing the feature point coordinates in the current feature point list, where q represents a serial number and $(x_q, y_q)$ is the observed quantity of the feature point, and a total number of the current feature points is $q_{max}$;

calculating, one by one, differences $\Delta \bar{x}_{nq}^i$ and $\Delta \bar{y}_{nq}^i$ between the observed quantity corresponding to the feature point coordinates in the current feature point list and the predicted observed quantity of an $n^{th}$ calibration point for the $i^{th}$ particle in the comparison list;

$$\begin{cases} \Delta \bar{x}_{nq}^i = \Delta x_n^{i'} - x_q \\ \Delta \bar{y}_{nq}^i = \Delta y_n^{i'} - y_q \end{cases};$$

forming simultaneous equations by a nearest neighbor method: calculating a minimum value $$\min\left(\sqrt{(\Delta \bar{x}_{nq}^i)^2 + (\Delta \bar{y}_{nq}^i)^2}, q = 1, 2 \ldots q_{max}\right)$$

of the feature point n in the comparison list, calculating a corresponding serial number $q_0$ of the minimum value, forming the simultaneous equations of n and $q_0$, with a corresponding error $\Delta \bar{x}_{nq_0 i}$ and $\Delta \bar{y}_{nq_0 i}$, denoted by $\Delta \bar{x}_n^i$ and $\Delta \bar{y}_n^i$, traversing the comparison list and executing the process, to accomplish feature point recognition and matching.

\* \* \* \* \*